United States Patent [19]

Abe et al.

[11] Patent Number: 5,575,255
[45] Date of Patent: Nov. 19, 1996

[54] THROTTLE CONTROL SYSTEM FOR INTERNAL COMBUSTION ENGINE

[75] Inventors: Kazuhiko Abe, Sagamihara; Masahiro Iriyama, Atsugi, both of Japan

[73] Assignee: Nissan Motor Co., Ltd., Yokohama, Japan

[21] Appl. No.: 354,862

[22] Filed: Dec. 9, 1994

[30] Foreign Application Priority Data

Dec. 28, 1993 [JP] Japan ................................. 5-333905

[51] Int. Cl.$^6$ .............................. F02D 9/02; F02D 11/00; B60K 28/16
[52] U.S. Cl. .................... 123/336; 123/339.1; 123/396; 180/197; 364/426.03
[58] Field of Search .......................... 123/339.1, 339.22, 123/339.24, 396, 336, 442; 180/197; 364/426.03

[56] References Cited

U.S. PATENT DOCUMENTS 5,220,828  6/1993  Sodeno et al. ........................ 123/442

FOREIGN PATENT DOCUMENTS 3-61654  3/1991  Japan .
4-58049  2/1992  Japan .

OTHER PUBLICATIONS

Patent Abstracts of Japan, vol. 18, No. 671, (M–1726), Dec. 19, 1994 & JP–A–6–264812, (Shiomi).

*Primary Examiner*—Andrew M. Dolinar
*Attorney, Agent, or Firm*—Lowe, Price, LeBlanc & Becker

[57] ABSTRACT

A throttle control system for controlling a throttle valve of an automotive internal combustion engine in order to securely accomplish a traction control. The throttle control system comprises a first throttle valve operated by an accelerator, and a second throttle valve controlled under the action of a control unit as follows: The fully closed position of the first throttle valve is learned as a first fully closed position corresponding value, when the first throttle valve is fully closed. The fully closed position of the second throttle valve is learned as a second fully closed position corresponding value under control of an actuator to compulsorily fully close the second throttle valve immediately after turning ON of a switch for allowing electric current to flow to the engine. A fast idle cam is provided to each of the first and second throttle valves to change the fully closed position of the first and second throttle valves larger in a direction to open each throttle valve as an engine temperature lowers to provide a change amount representative of a change in the first fully closed position corresponding value, under action of a thermally responsive member which is deformable in response to the engine temperature. The second fully closed position corresponding value of the second throttle valve is corrected in accordance with the change amount in the first fully closed position corresponding value, thereby controlling the opening degree at the fully closed position of the second throttle valve at a value suitable for the traction control.

15 Claims, 6 Drawing Sheets

THROTTLE CONTROL SYSTEM FOR INTERNAL COMBUSTION ENGINE

BACKGROUND OF THE INVENTION

1. Field of the Invention

This invention relates to improvements in a throttle control system for an internal combustion engine, and more particularly such a system for controlling a throttle valve to accomplish a traction control upon learning the fully closed position of the throttle valve.

2. Description of the Prior Art

Hitherto a traction control system for an automotive vehicle has been proposed and put into practical use to improve starting ability and acceleration of the vehicle on a slippery road surface by preventing wheel spin of driving road wheels of the vehicle under controlling engine torque and brake force when the driving road wheels are under a condition to tend to occur the wheel spin. Such a traction control system is disclosed, for example, in Japanese Patent Provisional Publication No. 4-58049.

In such a traction control system, in addition to a first throttle valve opened or closed depending upon an acceleration operation, a second throttle valve is provided and disposed in series with the first throttle valve to be opened or closed by an actuator. The second throttle valve is usually left opened, and compulsorily closed to a target opening degree under a predetermined operating condition for requiring a traction control. Additionally, the traction control system includes a throttle sensor for detecting the opening degree of the second throttle valve. The throttle control system is arranged to feedback-control the second throttle valve to obtain a target opening degree in a high precision, in accordance with a detection result of the throttle sensor. In this traction control system, for the purpose of avoiding lowering in precision of throttle valve opening degree due to non-uniform quality and/or deterioration of the throttle sensor, the second throttle valve is controlled to be compulsorily fully closed immediately after turning ON of a key switch, upon which an output of the throttle sensor at this time is learned as a fully closed position corresponding value, thereby maintaining the precision of a throttle opening degree control using the throttle sensor.

Furthermore, another throttle control system has been proposed as disclosed, for example, in Japanese Patent Provisional Publication No. 3-61654, in which a single throttle valve is used. In this throttle control system, the opening degree of the throttle valve is usually decided in accordance with the operation of an acceleration pedal, and is automatically controlled by an actuator regardless of the operation of the accelerator pedal under a predetermined operating condition requiring a traction control. Also in this throttle control system, a sensor is provided to detect the control amount or the like of the actuator for automatically controlling the opening degree of the throttle valve, upon which the control amount of the actuator is feedback-controlled to a target level in accordance with a detection result of the sensor. For the purpose of avoiding the lowering in precision of the control due to non-uniform quality and/or deterioration of the sensor, the actuator is compulsorily operated to fully close the throttle valve immediately after the turning ON of the key switch, upon which the output of the sensor at this time is learned as a fully closed position corresponding value thereby to maintain the precision of the throttle valve opening degree control by using the sensor.

However, drawbacks have been encountered in the above conventional throttle control systems as discussed below. With the former throttle control system accomplishing the traction control by using the first and second throttle valves, the fully closed position corresponding value (learning value) obtained immediately after the turning ON of the key switch cannot conform to an actual state of a vehicle operating condition in case that each of the first and second throttle valves are provided with a fast idle cam which is adapted to change the fully closed position of the throttle valve in accordance with the engine temperature. This results in a fear of an intended traction control being not able to be made in a high precision.

Also with the latter throttle control system for accomplishing the traction control by using the single throttle valve, the fully closed position corresponding value (learning value) obtained immediately after the turning ON of the key switch cannot conform to an actual state of a vehicle operating condition in case that the throttle valve is provided with a fast idle cam which is adapted to change the fully closed position of the throttle valve in accordance with the engine temperature. This results in a fear of an intended traction control being not able to be made at a high precision.

The above fast idle cam is arranged to compulsorily change the fully closed position of the throttle valve under the action of a wax pellet which is deformable in response to a temperature change in engine coolant of an automotive internal combustion engine.

Now, the above-mentioned learning of the fully closed position of the throttle valve as the fully closed position corresponding value is carried out once at a timing immediately after the turning ON of the key switch (before an engine starting) in order to be made securely and earlier. It will be understood that such a control for compulsorily fully closing the throttle valve provides no influence to engine operation. In case that the fully closed position of the throttle valve is offset to an open side (at which the throttle valve opens wider) in a cold engine condition, the fully closed position shifted under the action of the fast idle cam is unavoidably learned as the fully closed position corresponding value (learning value). Thereafter, even if the control of fully closing the throttle valve in response to the requirement of the traction control is to be made under a state in which the throttle valve can close to its inherent fully closed position upon completion of engine warming-up, the throttle valve can close only to its slightly opened state obtained under the action of the fast idle cam since the fully closing control of the throttle valve is made on an index which is the fully closed position learned at the timing of turning ON of the key switch. This makes impossible to achieve an intended output torque control while applying a large burden to a brake control.

SUMMARY OF THE INVENTION

It is an object of the present invention to provide an improved throttle control system for an internal combustion engine, which can effectively overcome drawbacks encountered in conventional throttle control systems intended to accomplish a traction control.

Another object of the present invention is to provide an improved throttle control system for an internal combustion engine, which can securely achieve an intended output torque control for the engine to accomplish a traction control while preventing a large burden from being applied to a brake control.

A further object of the present invention is to provide an improved throttle control system for an internal combustion engine, in which even though learning of a fully closed position of a throttle valve is made in a cold engine condition at which the fully closed position of the throttle valve offsets to an open side (at which throttle valve opens wider) under the action of a fast idle cam, the throttle valve can be effectively controlled to be closed to a target fully closed position conformable to an engine operating condition after completion of engine warming-up.

An aspect of the present invention resides, as shown in FIG. 1, in a throttle control system for an internal combustion engine on a vehicle, comprising a first throttle valve A1 operable to open and close in accordance with an operation of an accelerator, and a second throttle valve A2 arranged to be compulsorily closed to a target opening degree by an actuator A3 under a predetermined vehicle operating condition accomplishing a traction control. A first throttle sensor A4 is provided and adapted to output a detection signal representative of an opening degree of the first throttle valve. A second throttle sensor A5 is provided and adapted to output a detection signal representative of an opening degree of the second throttle valve. First fully closed position learning means A6 is provided to learn the detection signal of the first throttle sensor at a fully closed position of the first throttle valve as a first fully closed position corresponding value, when the first throttle valve is fully closed. Second fully closed position learning means A7 is provided to learn the detection signal of the second throttle sensor at a fully closed position of the second throttle valve as a second fully closed position corresponding value under control of the actuator to compulsorily fully close the second throttle valve immediately after turning ON of a switch for allowing electric current to flow to the engine. Fast idle control means A8 is provided to change the fully closed position of the first and second throttle valves larger in a direction to open each throttle valve as an engine temperature lowers to provide a change amount representative of a change in the first fully closed position corresponding value, under action of a thermally responsive member which is deformable in response to the engine temperature. Additionally, learning value correcting means A9 is provided to correct the second fully closed position corresponding value of the second throttle valve in accordance with the change amount in the first fully closed position corresponding value, provided by the fast idle control means.

According to the above aspect of the present invention, the fully closed positions of the respective first and second throttle valves change in accordance with the engine temperature under the action of the fast idle control means. Accordingly, under a cold engine condition, the fully closed position of the second throttle valve offset to an open side (the throttle valve open wider) under the action of the fast idle control means is learned as the fully closed position corresponding value in a fully closed position learning immediately after turning ON of the switch. Here, the offset of the fully closed position under the action of the fast idle control means is in accordance with the engine temperature, so that the offset amounts of the respective first and second throttle valves change generally the same. Accordingly, a learning value corresponding to the fully closed position of the second throttle valve after an engine warming-up is obtained by correcting the fully closed position corresponding value (learning value) in accordance with the change amount (provided by the fast idle control means) of the fully closed position corresponding value (at which the first throttle valve fully closes) learned by the first fully closed position learning means.

Another aspect of the present invention resides, as shown in FIG. 2, in a throttle control system for an internal combustion engine on a vehicle, comprising a throttle valve B1. An acceleration operating system B2 is provided to be operable to open and close the throttle valve in accordance with an operation of an accelerator to obtain an opening degree of the throttle valve. A traction control system B3 is provided to compulsorily close the throttle valve to a target opening degree by an operation of an actuator B4 under a predetermined vehicle operating condition requiring a traction control. Means is provided to cause the throttle valve to operate in accordance with a smaller value of the opening degrees in connection with the acceleration operating system and traction control system. An acceleration operating amount detecting means B5 is provided to detect an amount of operation depending upon the accelerator operation. An actuator operating amount detecting means B6 is provided to detect an amount of operation depending upon the actuator operation. An acceleration operating system fully closed position learning means B7 is provided to learn the operating amount detected by the acceleration operating amount detecting means as a first fully closed position corresponding value of the acceleration operating system, when the throttle valve is fully closed. Traction control system fully closed position learning means B8 is provided to learn the operating amount detected by the actuator operating amount detecting means at a fully closed position of the throttle valve as a second fully closed position corresponding value of the traction control system under control of the actuator to compulsorily fully close the second throttle valve immediately after turning ON of a switch for allowing electric current to flow to the engine. Fast idle control means B9 is provided to change the fully closed position of the throttle valve larger in a direction to open the throttle valve as an engine temperature lowers to provide a change amount representative of a change in the first fully closed position corresponding value, under action of a thermally responsive member which is deformable in response to the engine temperature. Additionally, learning value correcting means B10 is provided to correct the second fully closed position corresponding value learned by the traction control system fully closed position learning means in accordance with the change amount in the first fully closed position corresponding value, provided by the fast idle control means.

According to the above another aspect of the present invention, the fully closed position of the throttle valve changes in accordance with the engine temperature under the action of the fast idle control means. Accordingly, under a cold engine condition, the traction control system fully closed position learning means learns the fully closed position of the throttle valve offset to an open side (the throttle valve open wider) under the action of the fast idle control means is learned as the fully closed position corresponding value of the traction control system in a fully closed position learning immediately after turning ON of the switch. Here, the offset of the fully closed position under the action of the fast idle control system is in accordance with the engine temperature, so that as the offset amount of the throttle valve changes depending upon the engine temperature, the fully closed position corresponding value of the acceleration operating system learned by the acceleration operating system fully closed position learning means changes. Accordingly, a learning value corresponding to the fully closed position after an engine warming-up is obtained by correcting the fully closed position corresponding value (learning value) of the traction control system in accordance with the change amount (provided by the fast idle control means) of the fully closed position corresponding value (at which the first throttle valve fully closes) of the acceleration operating system.

As discussed above, according to the present invention, the fully closed position of the throttle valve after the engine warming-up is obtained by correcting the learning value in accordance with the change amount (provided by the fast idle control means) of the fully closed position corresponding value of the throttle valve, even though the fully closed position of the throttle valve is offset to the open side depending upon the engine temperature when the fully closed position learning is made immediately after the turning ON of the switch for an electric source. Accordingly, for example, during the traction control after engine warming-up, the throttle valve can be securely controlled to a suitable fully closed position by the throttle actuator.

DETAILED DESCRIPTION OF THE INVENTION

Figure 1:
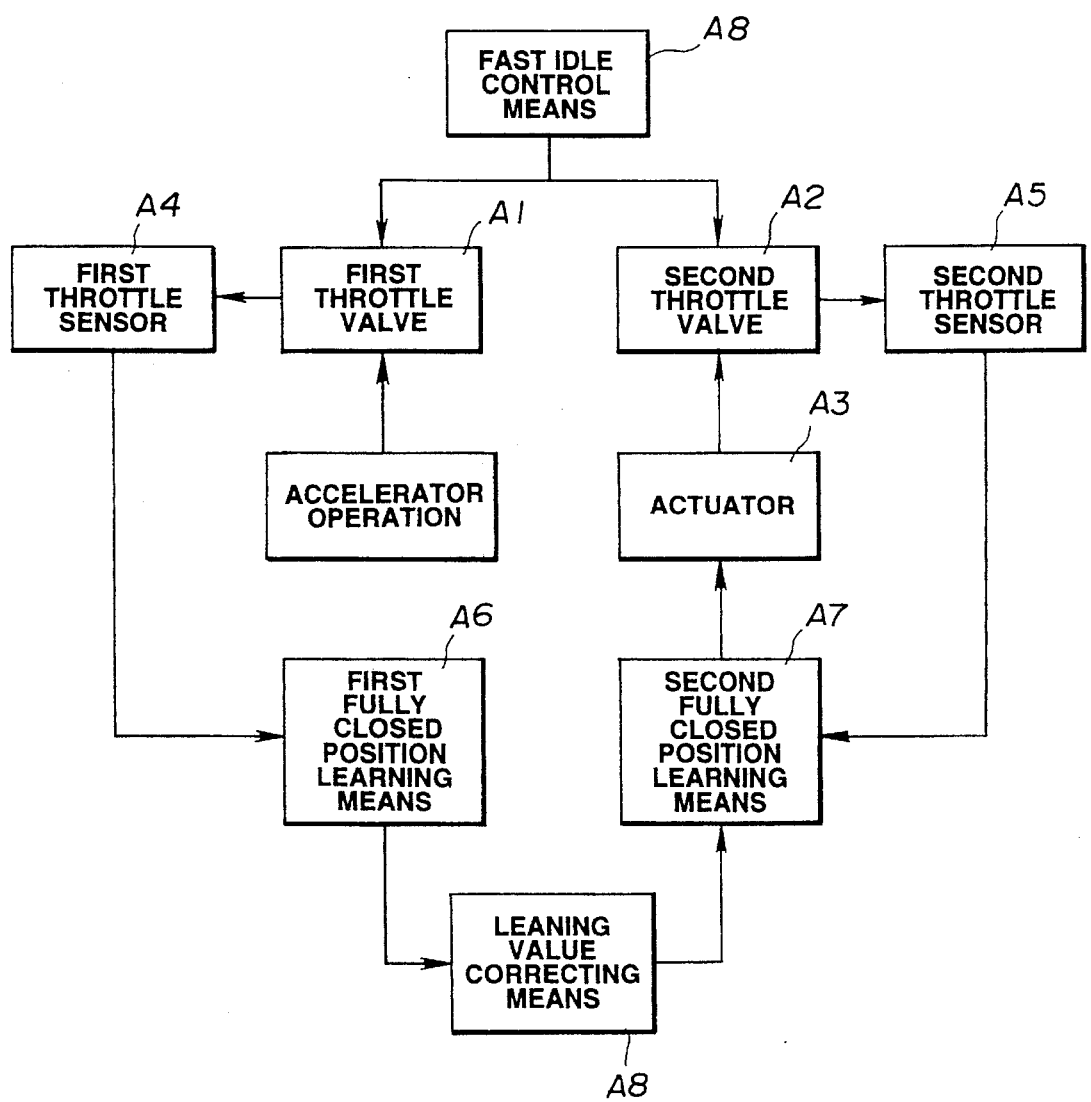
FIG. 1 is a block diagram showing an aspect of the idea of a throttle control system according to the present invention.
Figure 2:
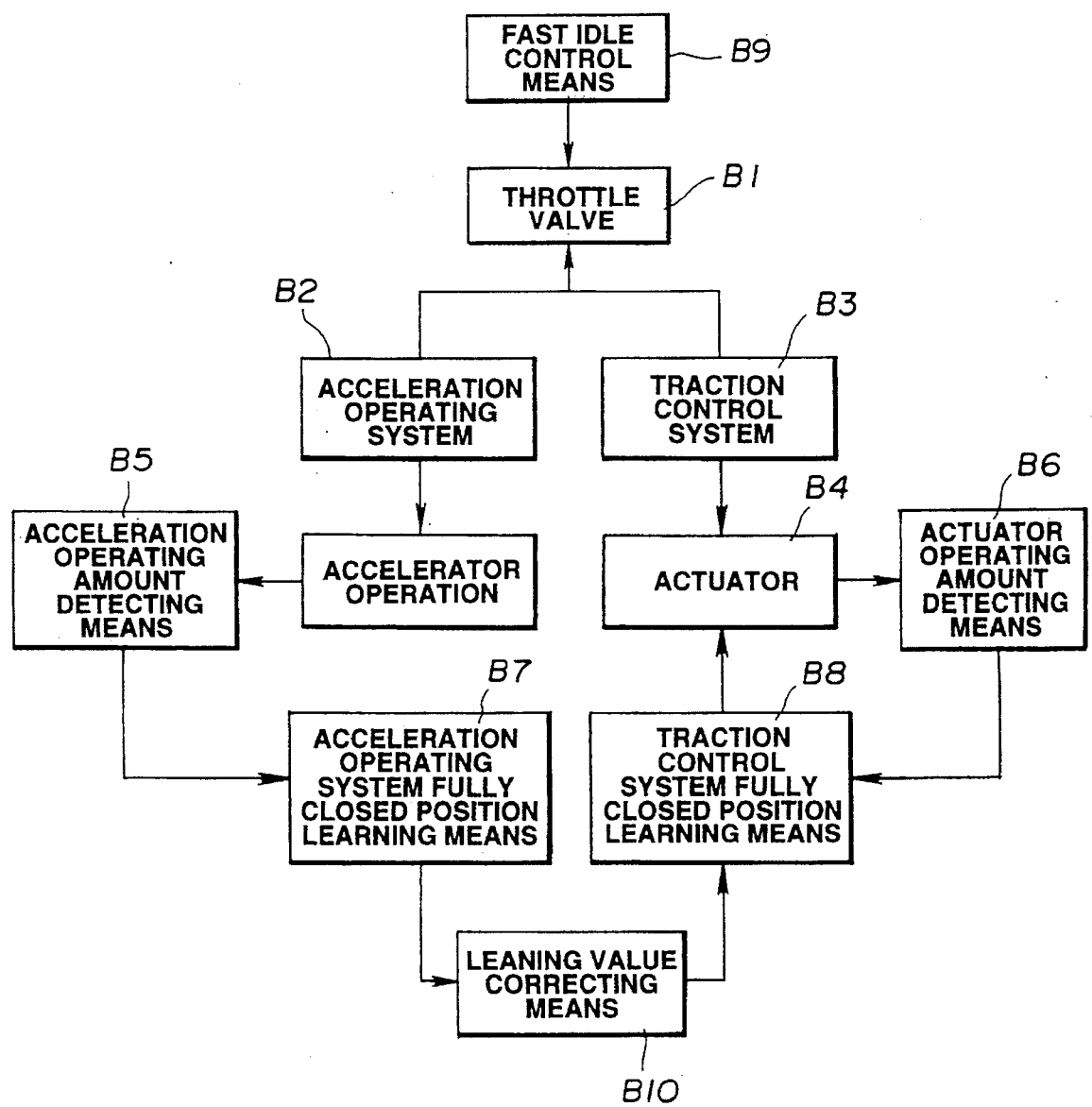
FIG. 2 is a block diagram showing another aspect of the idea of the throttle control system according to the present invention.
Figure 3:
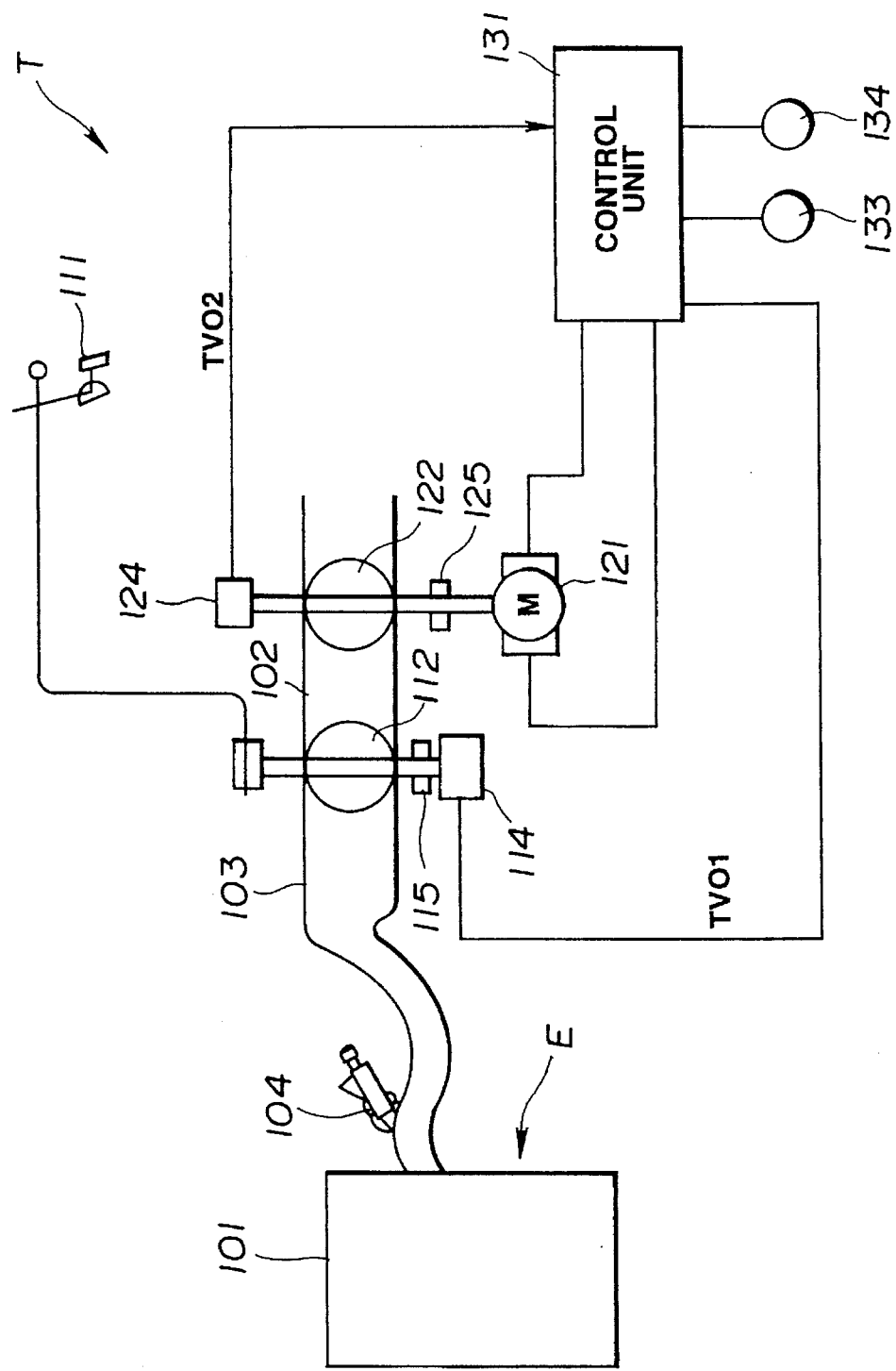
FIG. 3 is a schematic illustration of an embodiment of the throttle control system according to the present invention, corresponding to the aspect of FIG. 1.

Referring now to FIG. 3, a first embodiment of a throttle control system according to the present invention is illustrated by the reference character T. The throttle control system T is for an internal combustion engine E mounted on an automotive vehicle (not shown). The engine E includes an engine main body 101 having a plurality of engine cylinders (not shown). The engine E is provided with an air intake passageway 102 through which intake air is supplied to the respective engine cylinders of the engine main body 101. The engine E is provided with a throttle chamber 103 forming part of the air intake passageway 102. A fuel injector 104 is provided to inject fuel into intake air flowing through the intake air passageway 102 thereby to form air-fuel mixture to be supplied to the engine cylinders. The air-fuel mixture supplied in each engine cylinder is ignited by a spark from a spark plug (not shown) and exploded to operate the engine, and thereafter resultant exhaust gas is discharged out of the engine cylinders through an exhaust pipe (not shown).

A first throttle valve 112 is rotatably disposed inside the throttle chamber 103 and arranged to be controlled to be opened and closed under an operator's depression action on an acceleration pedal or accelerator 111. Accordingly, flow of intake air is controlled in relation to the depression action on the acceleration pedal 111. Additionally, a second throttle valve 122 is rotatably disposed inside the intake air passageway 102 and located upstream of the first throttle valve 112 relative to flow of intake air. The second throttle valve 122 is arranged to be normally closed and compulsorily opened under the action of a stepping motor 121 as an actuator. Accordingly, the second throttle valve 122 is drivably connected to the stepping motor 121.

A control unit 131 is provided to function a variety of controls for the engine E and the automotive vehicle. The control unit 131 also functions to serve as a control unit for a traction control system which makes a traction control for a road wheel or road wheels of the automotive vehicle to prevent so-called wheel spin from developing in the road wheels. Accordingly, the control unit 131 is electrically connected to a driving wheel rotation sensor 133 and to a non-driving wheel rotation sensor 134. The driving wheel rotation sensor 133 is adapted to detect a rotational condition of a driving road wheel (not shown) which is driven by the engine E. The non-driving wheel rotation sensor 134 is adapted to detect a rotational condition of a non-driving road wheel (not shown) which is not driven by the engine. A signal (representative of the rotational condition) of the driving wheel rotation sensor 133 and a signal (representative of the rotational condition) of the non-driving wheel rotation sensor 134 are input to the control unit 131 which makes a judgment as to whether the wheel spin will occur or not. When the control unit 131 makes such a judgment that the wheel spin will occur, the opening degree of the second throttle valve 122 is compulsorily decreased to reduce an output torque of the engine while increasing a braking power for the driving road wheel, thus accomplishing the traction control while preventing the wheel spin in the driving road wheel from occurrence.

A second throttle sensor 124 of the potentiometer type is provided for the second throttle valve 122 to detect the opening degree or angular position of the second throttle valve 122. By using the detected opening degree, the second throttle valve 122 is driven to be controlled to have a target opening degree under the action of the stepping motor 121. A detection signal representative of the opening degree of the second throttle valve 122, from the second throttle sensor 124 is input to the control unit 131. Accordingly, the control unit 131 also functions to feedback-control the opening degree of the second throttle valve 122 at the target level (opening degree) in accordance with the detection signal output from the second throttle sensor 124. More specifically, the control units 131 functions to set the target opening degree (target level) of the second throttle valve 122 to reduce the engine output torque during an operation of the traction control, and to feedback-control the stepping motor 121 in accordance with the detection signal from the second throttle sensor 124 in order to control the opening degree of the second throttle valve 122 at the target level.

In this embodiment, for the purpose of preventing a precision in control of the opening degree of the second throttle valve 122 from lowering owing to non-uniform quality and/or deterioration of the second throttle sensor 124, the control unit 131 makes such a control as to compulsorily fully close the second throttle valve 122 immediately after a key switch or ignition switch (not shown) is turned ON, and then learn an output of the second throttle sensor 124 at this time as a value corresponding to the fully closed position of the second throttle valve 122.

A first throttle sensor 114 of the potentiometer type is provided for the first throttle valve 112 in such a way as to detect an opening degree or angular position of the first throttle valve 112. The first throttle sensor 114 is adapted to output a signal representative of the opening degree of the first throttle valve 112.

In addition, a first fast idle cam 115 is provided for the first throttle valve 112 in such a way as to change a fully closed position of the first throttle valve 112. A second fast idle cam 125 is provided for the second throttle valve 122 in such a way as to change a fully closed position of the second throttle valve 122. The fully closed position of each throttle valve 112, 122 is changed larger in a direction to open the throttle valve 112, 122 as a temperature (engine temperature) of engine coolant in the engine body 101 is lower, under the action of a wax pellet (a thermally responsive member) which is thermally deformable in response to the engine coolant temperature. It will be appreciated that each of the first and second fast idle cam 115, 125 is operatively connected to the wax pellet in contact with the engine coolant.

Thus, learning the fully closed position or opening degree of the throttle valve 112, 122 is affected by an offset of the second fast idle cam 125 in the direction to open the fully closed position under change of the fully closed position of the throttle valve. Therefore, in this embodiment, a learning value of the fully closed position or opening degree of the second throttle valve 122 is corrected according to a flowchart of FIG. 4 thereby to accomplish a high precision control for opening degree or angular position of the second throttle valve 122.

Figure 4:
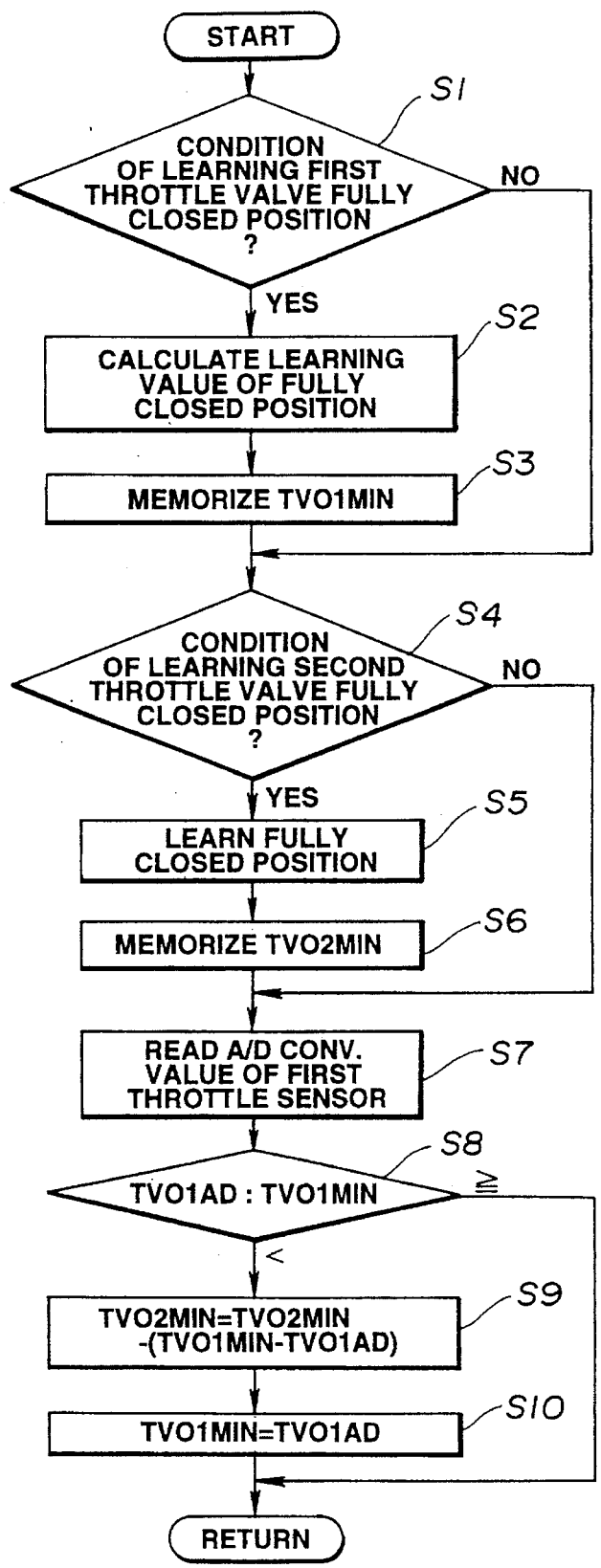
FIG. 4 is a flowchart showing a control manner used in the embodiment of FIG. 3.

The flowchart of FIG. 4 is executed every a predetermined time under the action of the control unit 131.

At a step S1, a judgment is made as to whether an engine operating condition is for learning the fully closed position of the first throttle valve 112 or not. More specifically, the judgment is made as to whether the present timing is immediately after the key switch is turned ON from its OFF state or not, or an idle switch (not shown) is turned ON or not.

A flow goes to a step S2 when the engine operating condition is for learning the fully closed position of the first throttle valve 112. At the step S2, a calculation for a learning value or the fully closed position is made in order to accomplish the learning. More specifically, a A/D converted value (corresponding to an opening degree TVO1MIN) of the output voltage of the first throttle sensor 114 at the fully closed position of the first throttle valve 112 is read. Otherwise, a weighted mean value of this value and a value learned at a past time may be set as the learning value of the fully closed position of the throttle valve 112.

At a step S3, the fully closed position or opening degree TVO1MIN of the first throttle valve 112 calculated at the step S2 is memorized as an initial value in a RAM of the control unit 131.

The flow goes to a step S4 in case that the judgment of the engine operating condition being not for learning the fully closed position of the first throttle valve 112 is made at the step S1, or after the flow passes through the step S3. Thus, leaning of the fully closed position or opening degree of the first throttle valve 112 is achieved at the steps 1 to 3.

At a step S4, a judgment is made as to whether an engine operating condition is for learning the fully closed position of the second throttle valve 122 or not. More specifically, a judgment is made as to whether a transmission (not shown) is in a neutral position under an idle operating condition at which the idle switch is turned ON, or not.

A flow goes to a step S5 when the engine operating condition is judged to be for learning the fully closed position of the second throttle valve 122. At the step S5, a calculation for the learning value or the fully closed position is made in order to accomplish the learning. More specifically, a A/D converted value (corresponding to an opening degree TVO2MIN) of the output voltage of the second throttle sensor 124 at the fully closed position of the second throttle valve 122 is read. At a step S6, the fully closed position or opening degree TVO2MIN of the second throttle valve 122 learned at the step S5 is memorized as a learning value in the RAM of the control unit 131.

The flow goes to a step S7 in case that the judgment of the engine operating condition being not for learning the fully closed position of the second throttle valve 122 is made at the step S4, or after the flow passes through the step S6. Thus, leaning of the fully closed position or opening degree of the second throttle valve 122 is achieved at the steps 4 to 6.

At a step S7, a A/D converted value TVO1AD of an output voltage of the first throttle sensor 114 is read.

At a step S8, a comparison is made between the A/D converted value TVO1AD of the output voltage of the first throttle sensor 114 read in the step S7 and the fully closed position TVO1MIN of the first throttle valve 112 memorized in the RAM at the step S3.

In case of TVO1AD<TVO1MIN as a result of the comparison at the step S8, the first throttle valve 112 is newly fully closed under an operator's depression operation on the acceleration pedal 111 to fully close the first throttle valve 112. Additionally, the first fast idle cam 115 is provided for the first throttle valve 112 in such a way as to change the fully closed position of the first throttle valve 112 larger in the direction to open the throttle valve 112 as the engine coolant temperature is lower. These leads to such a judgment that the fully closed position of the first throttle valve 112 has been changed in a direction to close the first throttle valve 112, and therefore the flow goes to a step S9.

At the step S9, it is assumed that the fully closed positions of the first and second throttle valves 112, 122 generally simultaneously have changed in the direction to close the throttle valve upon a rise in engine temperature or the engine coolant temperature, and therefore a correction is made on the fully closed position or opening degree TVO2MIN of the second throttle valve 122. In other words, the fully closed position of the first throttle valve 112 has changed in the direction to close the throttle valve upon the rise in the engine temperature by an amount $\Delta TVO1$ as set forth below.

$$\Delta TVO1 = TVO1MIN - TVO1AD$$

It is assumed that offset amounts in the fully closed position of the respective first and second throttle valves 112, 122 change generally the same under the action of the engine temperature. Consequently, the fully closed position or opening degree TVO2MIN of the second throttle valve 122 is corrected as shown in the following equation:

$$TVO2MIN = TVO2MIN - \Delta TVO1 = TVO2MIN - (TVO1MIN - TVO1AD)$$

At a step S10, in order to deal with a correction of the learning value of the fully closed position which has been changed in the direction to close the first throttle valve 112 upon a new rise in the engine temperature, the A/D converted value TVO1AD read at the step S7 is newly memorized as the fully closed position or opening degree TVO1MIN of the first throttle valve 112.

At the step S8, when a judgment of TVO1AD<TVO1MIN is made, a condition is TVO1AD=TVO1MIN, or TVO1AD>TVO1MIN. Here, the case of TVO1AD= TVO1MIN corresponds to a state in which the first throttle valve 112 is newly fully closed under the operator's depression action on the accelerator pedal 111 to fully close the first throttle valve 112, so that the first throttle valve 112 has been closed to its fully closed position regulated by the first fast idle cam 115. This is judged as to be in a condition that the engine temperature has not yet risen and therefore the fully closed position of the first throttle valve 112 has not changed in the direction to close the throttle valve even under the action of the first fast idle cam 115. Consequently, it is assumed that no correction is necessary for the fully closed position or opening degree TVO2MIN of the second throttle valve 122, and therefore the flow returns as it is.

The case of TVO1AD>TVO1MIN corresponds to a state in which a correction cannot be made on the fully closed position or opening degree TVO2MIN of the second throttle valve 122 since the operator has not made a depression action on the acceleration pedal 111 to fully close the throttle valve. In this case, the flow returns as it is.

Thus, the correction for the learning value is achieved at the steps 7 to 10.

As appreciated from the above, the fully closed positions of the first and second throttle valves 112, 122 change in accordance with the engine temperature under the action of the first and second fast idle cams 115, 125. According to the fully closed position learning of the second throttle valve 122 in the first embodiment, whenever the operator makes a depression action on the acceleration pedal 111 to fully close the first throttle valve 112, the change of the fully closed position of the first throttle valve 112 in the direction to close the throttle valve is learned to produce the learning value. Then, the fully closed position of the second throttle valve 122 is corrected in accordance with the learning value. Consequently, the thus corrected fully closed position of the second throttle valve 122 is conformable to an actual engine operating condition even if the engine temperature rises.

In other words, even when the throttle valve is brought into closure to an inherent fully closed position upon completion of warming-up of the engine, the fully closed position of the second throttle valve 122 can be changed to a suitable position without compulsorily operating the stepping motor 121 to close the throttle valve during a vehicle cruising and therefore without providing any trouble to engine operation. Thus, in case of carrying out a control for fully closing the second throttle valve in accordance with requirements of the above-discussed traction control, the second throttle valve 122 can be closed to its fully closed position (a "completely closed" fully closed position) even after warming-up of the engine at which the first throttle valve 122 has been brought from a fully closed position (a "partly opened" fully closed position) to another fully closed position (the "completely closed" fully closed position) under the action of the first fast idle cam 115, thereby achieving an intended output torque control while preventing a burden from being applied to a brake control. It will be understood that "completely closed" fully closed position is more in a direction to close the throttle valve relative to the "partly opened" fully closed position. Thus, the "completely closed" fully closed position is obtained after the warming-up of the engine has been completed, while the "partly opened" fully closed position is obtained before the warming-up of the engine has been completed.

Thus, even after the change in the fully closed position of the first throttle valve 112 is made from the above-mentioned "partly opened" fully closed position to the above-mentioned "completely closed" fully closed position under a condition at which the engine temperature has risen, the second throttle valve 122 can be controllably closed to the above-mentioned "completely closed" fully closed position, thereby securely achieving the traction control under the learning control of the second throttle valve 122.

Figure 5:
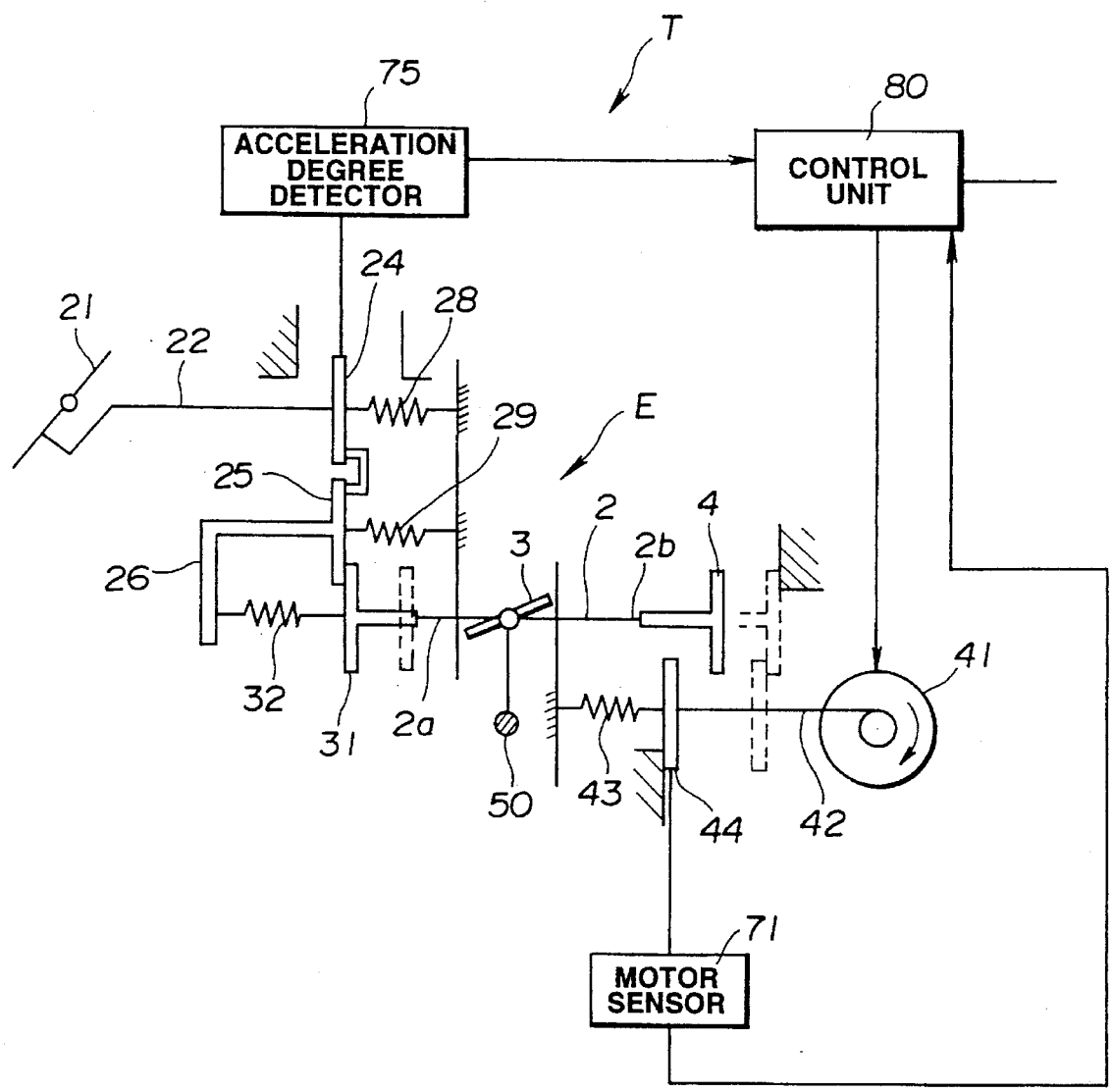
FIG. 5 is a schematic illustration of another embodiment of the throttle control system according to the present invention, corresponding to the aspect of FIG. 2.

FIG. 5 illustrates a second embodiment of the throttle control system T according to the present invention, similar to that of the first embodiment. In FIG. 5, a rotational movement of various shafts or axes are shown as a right or left movement in the figure. This embodiment is arranged to accomplish the traction control to prevent the wheel spin in the driving wheel from occurring by reducing an engine output torque while increasing brake power to the driving wheel, under the action of only one throttle valve 3 without using two throttle valve (112, 122 as in the first embodiment). The throttle control system T of the second embodiment is similar to that of the first embodiment and therefore discussion will be made only on arrangements different from the first embodiment.

A butterfly type throttle valve 3 is fixedly mounted on a throttle shaft 2 which is rotatably supported on a support member (not shown) of a throttle body of the engine E. An acceleration drum shaft 22 is movably supported to the throttle body and has an axis parallel with the throttle shaft 2. An acceleration drum 24 forming part of an acceleration operating system (not identified) is supported to the acceleration drum shaft 22 and arranged to rotate around the acceleration shaft 22 in relation to a driver's operation or depression on an acceleration pedal or accelerator 21. An acceleration lever 25 having an engaging lever 26 is formed integral with the acceleration drum 24. The acceleration drum 24 and the acceleration lever 25 are biased in a direction to close a throttle valve 3 or in a direction in which no depression or operation is made to the acceleration pedal 21, under the action of springs 28, 29, respectively.

A stepping motor 41 as an actuator forming part of a traction control system (not identified) is supported to the throttle body at a location near an end section of the throttle shaft 2 and has an output shaft 42 parallel with the throttle shaft 2. An actuator movable member 44 is provided to be moved in relation to the stepping motor 41, and springly biased in the direction to open the throttle valve 3 by a first spring 43 having a first predetermined biasing force. The actuator movable member 44 is arranged to cause the throttle shaft 2 to rotate only in the direction to close the throttle valve 3, upon engagement with an engaging lever 4 (provided at the end section 2b of the throttle shaft 2) only in one direction. Here, when the stepping motor 41 is not controllably driven, the actuator movable member 44 is stopped at a position at which the stepping motor 41 allows the throttle valve to be put into a fully closed position, under the first predetermined biasing force of the first spring 43.

A lost motion lever 31 is provided at the end section 2a of the throttle shaft 2. This lost motion lever 31 is arranged to normally engage with the acceleration lever 25 upon being biased to be tensioned under the action of the engaging lever 26 and a lost motion spring 32, and rotates independently from the acceleration lever 25 to release the engagement with the acceleration lever 25 when the throttle shaft 2 rotates in the direction to open the throttle valve 3. In other words, when the acceleration drum 24 rotates in the direction to open the throttle valve 3, the lost motion lever 31 rotates in the direction to open the throttle valve 3 together with the acceleration lever as a one-piece member under the tensional biasing force of the lost motion spring 32, since the lost motion lever 31 is brought into engagement with the acceleration lever 25 under the tensional biasing force of the lost motion spring 32. When the stepping motor 41 rotates in the direction to close the throttle valve 3 under a condition in which the acceleration drum 24 is fixed to obtain a predetermined opening degree of the throttle valve 3, the throttle shaft 2 rotates in the direction to close the throttle valve 3 thereby to cause the lost motion lever 31 to rotate in the direction to close the throttle valve 3 against the tensional biasing force of the lost motion spring 32, since the actuator movable member 44 is engaged with the engaging member to allow the throttle shaft 2 to rotate only in the direction to close the throttle valve 3. Thus, the engagement of the lost motion lever 31 and the acceleration lever 25 is released, and then the throttle shaft 2 rotates to allow the throttle valve 3 to be closed while maintaining the location of the acceleration drum 24 as it is. It will be understood that the tensional biasing force of the lost motion spring 32 is larger than the first predetermined biasing force of the first spring 43.

In this embodiment, a motor sensor 71 is fixedly supported to the actuator movable member 44 and adapted to detect a rotational amount of the stepping motor 41. Thus, the motor sensor 71 functions to detect an amount of operation depending upon the operation of the actuator or stepping motor 41. An acceleration degree detector 75 is provided to detect an amount of rotation of the acceleration drum 24, i.e., an amount of operation or depression of the acceleration pedal 21. Thus, the acceleration degree detector 75 functions to detect an amount of acceleration operation. In the above-mentioned throttle control system for an internal combustion engine, control of throttling is carried out by the control unit 80 in accordance with detection signals from the motor sensor 71 and the acceleration degree detector 75.

Accordingly, the control unit 80 also functions to feedback-control the opening degree of the throttle valve 3 at the target level (opening degree) in accordance with the detection signal output from the motor sensor 71. More specifically, the control unit 80 functions to set the target opening degree (target level) of the throttle valve 3 to reduce the engine output torque during an operation of the traction control, and to feedback-control the stepping motor 41 in accordance with the detection signal from the motor sensor 71 in order to control the opening degree of the throttle valve at the target level.

In this embodiment, for the purpose of preventing a precision in control of the opening degree of the throttle valve 3 from lowering owing to non-uniform quality and/or deterioration of the motor sensor 71, the control unit 80 makes such a control as to compulsorily fully close the throttle valve 3 immediately after the key switch or ignition switch (not shown) is turned ON, and then learn an output of the motor sensor 71 at this time as a value corresponding to the fully closed position of the throttle valve 3.

In addition, a fast idle cam 50 is provided for the throttle valve 3 in such a way as to change a fully closed position of the throttle valve 3. The fully closed position of the throttle valve is changed larger in a direction to open the throttle valve as the temperature (engine temperature) of engine coolant in the engine body is lower, under the action of a wax pellet (a thermally responsive member) which is thermally deformable in response to the engine coolant temperature. It will be appreciated that the fast idle cam 50 is operatively connected to the wax pellet in contact with the engine coolant.

Figure 6:
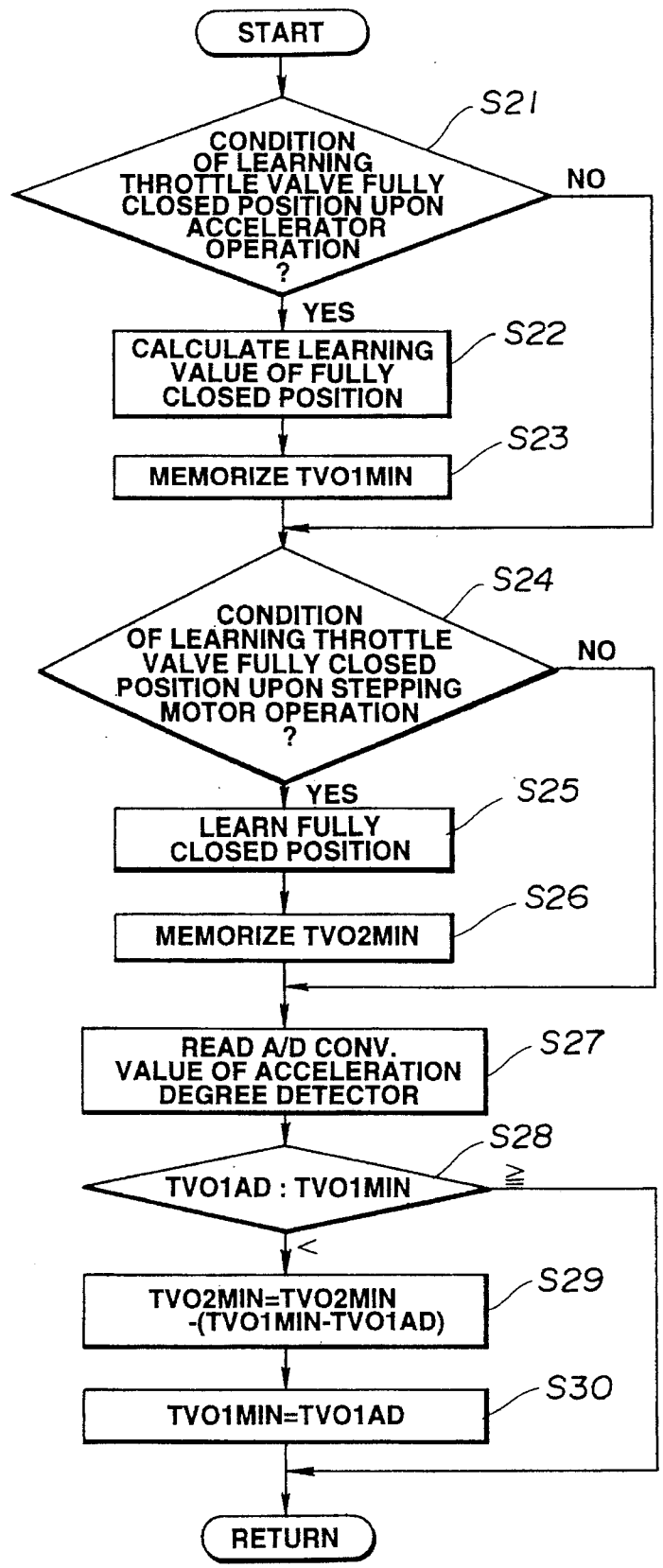
FIG. 6 is a flowchart showing a control manner used in the embodiment of FIG. 5.

Thus, learning the fully closed position or opening degree of the throttle valve 3 is affected by an offset of the fast idle cam 50 in the direction to open the fully closed position under change of the fully closed position of the throttle valve. Therefore, in this embodiment, a learning value of the fully closed position or opening degree of the throttle valve 3 is corrected according to a flowchart of FIG. 6 thereby to accomplish a high precision control for opening degree or angular position of the throttle valve 3. The flowchart of FIG. 6 is executed every a predetermined time under the action of the control unit 80.

At a step S21, a judgment is made as to whether an engine operating condition is for learning the fully closed position of the throttle valve 3 upon an operation of the acceleration pedal 21 to allow the throttle valve 3 to fully close, or not. More specifically, for example, the judgment is made as to whether the present timing is immediately after the key switch is turned ON from its OFF state or not before an engine starting, or an idle switch (not shown) is turned ON or not.

A flow goes to a step S22 when the engine operating condition is for learning the fully closed position of the throttle valve 3. At the step S22, a calculation for a learning value or the fully closed position is made in order to accomplish the learning. More specifically, a A/D converted value (corresponding to an opening degree TVO1MIN) of the output voltage of the acceleration degree detector 75 at the fully closed position of the throttle valve 3 is read. Otherwise, a weighted mean value of this value and a value learned at a past time may be set as the learning value of the fully closed position of the throttle valve 3.

At a step S23, the fully closed position or opening degree TVO1MIN of the throttle valve 3 calculated at the step S22 is memorized as an initial value in a RAM of the control unit 80.

The flow goes to a step S24 in case that the judgment of the engine operating condition being not for learning the fully closed position of the throttle valve is made at the step S21, or after the flow passes through the step S23. Thus, leaning of the fully closed position or opening degree of the throttle valve 3 is achieved at the steps 21 to 23.

At a step S24, a judgment is made as to whether an engine operating condition is for learning the fully closed position of the throttle valve 3 upon an operation of the stepping motor 41 to allow the throttle valve 3 to fully close, or not. More specifically, a judgment is made as to whether a transmission (not shown) is in a neutral position under an idle operating condition at which the idle switch is turned ON, or not.

A flow goes to a step S25 when the engine operating condition is judged to be for learning the fully closed position of the throttle valve 3. At the step S25, a calculation for the learning value or the fully closed position is made in order to accomplish the learning. More specifically, a A/D converted value (corresponding to an opening degree TVO2MIN) of the output voltage of the motor sensor 71 at the fully closed position of the throttle valve 3 is read. At a step S26, the fully closed position or opening degree TVO2MIN of the throttle valve 3 learned at the step S25 is memorized as a learning value in the RAM of the control unit 80.

The flow goes to a step S27 in case that the judgment of the engine operating condition being not for learning the fully closed position of the throttle valve 3 is made upon the operation of the stepping motor 41 to allow the throttle valve to fully close at the step S24, or after the flow passes through the step S6. Thus, leaning of the fully closed position or opening degree of the throttle valve 3 is achieved at the steps 24 to 26.

At a step S27, a A/D converted value TVO1AD of an output voltage of the acceleration degree detector 75 is read.

At a step S28, a comparison is made between the A/D converted value TVO1AD of the output voltage of the acceleration degree detector 75 read in the step S27 and the fully closed position TVO1MIN of the throttle valve 3 memorized in the RAM at the step S23.

In case of TVO1AD<TVO1MIN as a result of the comparison at the step S28, the throttle valve 3 is newly fully closed under an operator's depression operation on the acceleration pedal 21 to fully close the throttle valve 3. Additionally, the fast idle cam 50 is provided for the throttle valve 3 in such a way as to change the fully closed position of the throttle valve 3 larger in the direction to open the throttle valve 3 as the engine coolant temperature is lower. These leads to such a judgment that the fully closed position of the throttle valve 3 has been changed in a direction to close the throttle valve 3, and therefore the flow goes to a step S9.

At the step S29, it is assumed that the fully closed position of the throttle valve 3 has changed in the direction to close the throttle valve upon a rise in engine temperature or the engine coolant temperature, and therefore a correction is made on the fully closed position or opening degree TVO2MIN of the throttle valve 3 upon the operation of the stepping motor 41 to allow the throttle valve to fully close. In other words, the fully closed position of the throttle valve 3 has changed in the direction to close the throttle valve upon the rise in the engine temperature by an amount $\Delta TVO1$ as set forth below.

$$\Delta TVO1 = TVO1MIN - TVO1AD$$

It is assumed that offset amounts in the fully closed position of the respective throttle valve 3 upon the operation of the stepping motor 41 to allow the throttle valve to fully close changes under the action of the engine temperature. Consequently, the fully closed position or opening degree TVO2MIN of the throttle valve 3 is corrected as shown in the following equation:

$$TVO2MIN = TVO2MIN - \Delta TVO1 = TVO2MIN - (TVO1MIN - TVO1AD)$$

At a step S30, in order to deal with a correction of the learning value of the fully closed position which has been changed in the direction to close the throttle valve 3 upon a new rise in the engine temperature, the A/D converted value TVO1AD read at the step S27 is newly memorized as the fully closed position or opening degree TVO1MIN of the throttle valve 3.

At the step S28, when a judgment of TVO1AD<TVO1MIN is made, a condition is TVO1AD= TVO1MIN, or TVO1AD>TVO1MIN. Here, the case of TVO1AD=TVO1MIN corresponds to a state in which the first throttle valve 112 is newly fully closed under the operator's depression action on the accelerator pedal 21 to allow the throttle valve 3 to fully close, so that the throttle valve 3 has been closed to its fully closed position regulated by the fast idle cam 50. This is judged as to be in a condition that the engine temperature has not yet risen and therefore the fully closed position of the throttle valve 3 upon the operation of the stepping motor 41 to allow the throttle valve to fully close has not changed in the direction to close the throttle valve even under the action of the fast idle cam 50. Consequently, it is assumed that no correction is necessary for the fully closed position or opening degree TVO2MIN of the throttle valve 3 upon the operation of the stepping motor 41 to allow the throttle valve to fully close, and therefore the flow returns as it is.

The case of TVO1AD>TVO1MIN corresponds to a state in which a correction cannot be made on the fully closed position or opening degree TVO2MIN of the throttle valve 3 upon the operation of the stepping motor 41 to allow the throttle valve to fully close since the operator has not made a depression action on the acceleration pedal 111 to allow the throttle valve to fully close. In this case, the flow returns as it is.

Thus, the correction for the learning value is achieved at the steps 27 to 30.

As appreciated from the above, the fully closed position of the throttle valve 3 upon the operation of the acceleration pedal 21 to allow the throttle valve 3 to fully close and the fully closed position of the throttle valve 3 upon the operation of the stepping motor 41 to allow the throttle valve 3 to fully close change in accordance with the engine temperature under the action of the fast idle cam 50. According to the fully closed position learning of the throttle valve 3 in the second embodiment, whenever the operator makes a depression action on the acceleration pedal 21 to fully close the throttle valve 3, the change of the fully closed position or opening degree TVO1MIN of the throttle valve 3 upon the depression action on the acceleration pedal 21 to allow the throttle valve 3 to fully close is learned to produce the learning value. Then, the fully closed position of the throttle valve 3 upon the operation of the stepping motor 41 to allow the throttle valve 3 to fully close is corrected in accordance with the learning value. Consequently, the thus corrected fully closed position of the throttle valve 3 is conformable to an actual engine operating condition even if the engine temperature rises.

In other words, even when the throttle valve is brought into closure to an inherent fully closed position upon completion of warming-up of the engine, the fully closed position of the throttle valve 3 upon the operation of the stepping motor 41 to allow the throttle valve to fully close can be changed to a suitable position without compulsorily operating the stepping motor 41 to close the throttle valve during a vehicle cruising and therefore without providing any trouble to engine operation. Thus, in case of carrying out a control for fully closing the throttle valve 3 in accordance with requirements of the above-discussed traction control, the throttle valve 3 can be closed to its fully closed position (the "completely closed" fully closed position) upon the operation of the stepping motor 41 to allow the throttle valve to fully close even after warming-up of the engine at which the throttle valve 3 has been brought from a fully closed position (the "partly opened" fully closed position) to another fully closed position (the "completely closed" fully closed position) under the action of the fast idle cam 50, thereby achieving an intended output torque control while preventing a burden from being applied to a brake control.

Thus, even after the change in the fully closed position of the throttle valve 3 is made from the above-mentioned "partly opened" fully closed position (under the action of the fast idle cam 50) to the above-mentioned "completely closed" fully closed position under a condition at which the engine temperature has risen, the throttle valve 3 can be controllably closed to the above-mentioned "completely closed" fully closed position, thereby securely achieving the traction control under the learning control of the throttle valve 3.

What is claimed is:

1. A throttle control system for an internal combustion engine on a vehicle, comprising:

throttle means opened and closed in response to operation of an accelerator and, under a predetermined vehicle operating condition requiring traction control, compulsorily closed to a target opening degree in accordance with an actuator, said throttle means providing an opening degree of said throttle means as an operating amount thereof;

control means for:
  learning a first operating amount as a first fully closed position corresponding value of said throttle means for acceleration control means when said throttle means is at a first, fully closed, position, and
  learning a second operating amount as a second fully closed position corresponding value of said throttle means for traction control under control of said actuator to compulsorily close said throttle means to a second position immediately after turning ON of a switch for allowing electric current to flow to the engine; and
fast idle. control means for changing the fully closed position of said throttle means in an increasing direction to open said throttle means as an engine temperature lowers to provide a change amount representative of a charge in said first fully closed position corresponding value, under action of a thermally responsive member which is deformable in response to the engine temperature;
wherein said control means further operates for correcting said second fully closed position corresponding value of said throttle means in accordance with said change amount in said first fully closed position corresponding value provided by said fast idle control means.

2. A throttle control means system in accordance with claim 1, wherein said throttle means comprises first and second throttle valves,
  said first throttle valve operating in response to said accelerator and said second throttle valve operating in response to said actuator,
  wherein said first fully closed position corresponding valve and said first, fully closed, position, of said throttle means corresponds to a fully closed position of said first throttle valve and
  said second fully closed position corresponding value of said throttle means corresponds to a fully closed position of said second throttle valve.

3. A throttle control system in accordance with claim 1, wherein said throttle means comprise a throttle valve operating in response to said accelerator and said actuator.

4. A throttle control system for an internal combustion engine on a vehicle, comprising:
  a first throttle valve operable to open and close in accordance with an operation of an accelerator;
  a second throttle valve arranged to be compulsorily closed to a target opening degree by an actuator under a predetermined vehicle operating condition requiring a traction control;
  a first throttle sensor adapted to output a detection signal representative of an opening degree of said first throttle valve;
  a second throttle sensor adapted to output a detection signal representative of an opening degree of said second throttle valve;
  control means for:
    learning the detection signal of said first throttle sensor at a fully closed position of said first throttle valve as a first fully closed position corresponding value, when said throttle valve is fully closed; and for
    learning the detection signal of said second throttle sensor at a fully closed position of said second throttle valve as a second fully closed position corresponding value under control of said actuator to compulsorily fully close said second throttle valve immediately after turning ON of a switch for allowing electric current to flow to the engine; and
  fast idle control means for changing the fully closed position of said first and second throttle valves larger in a direction to open each throttle valve as an engine temperature lowers to provide a change amount representative of a change in said first fully closed position corresponding value, under action of a thermally responsive member which is deformable in response to the engine temperature;
wherein said control means further operates for correcting said second fully closed position corresponding value of said second throttle valve in accordance with said change amount in said first fully closed position corresponding value, provided by said fast idle control means.

5. A throttle control system as claimed in claim 4, wherein said first and second throttle valves are located inside a chamber through which intake air flows to engine cylinders of the engine, said second throttle valve being located upstream of said first throttle valve relative to flow of the intake air.

6. A throttle control system as claimed in claim 4, wherein said actuator is a stepping motor operatively connected to said first throttle valve.

7. A throttle control system as claimed in claim 4, wherein said switch is an ignition switch electrically connected to an ignition system of the engine.

8. A throttle control system as claimed in claim 4, wherein said fast idle control means includes a fast idle cam operatively connected to said first throttle valve, wherein said thermally response member is a wax pellet operatively connected to said fast idle cam.

9. A throttle control system as claimed in claim 4, wherein said control means further operates for correcting said second fully closed position corresponding value by subtracting said change amount from said second fully closed position corresponding value which is before being changed by said fast idle control means.

10. A throttle control system for an internal combustion engine on a vehicle, comprising:
  a throttle valve;
  an acceleration operation system operable to open and close said throttle valve in accordance with an operation of an accelerator to obtain an operating degree of said throttle valve;
  a traction control system for compulsorily closing said throttle valve to a target opening degree by an operation of an actuator under a predetermined vehicle operation condition requiring traction control;
  means for causing said throttle valve to operate in accordance with a smaller value of said opening degrees in connection with said accelerator operating system and traction control system;
  acceleration operating amount detecting means for detecting an amount of operation depending upon the accelerator operation;
  actuator operating amount detecting means for detecting an amount of operation depending upon the actuator operation;
  control means for:
    learning said operating amount detected by said acceleration operating amount detecting means as a first fully closed position corresponding value of said acceleration operating system, when said throttle valve is fully closed; and for
    learning said operating amount detected by said actuator operating amount detecting means at a fully closed position of said throttle valve as a second fully closed position corresponding value of said traction control system under control of said actuator to compulsorily fully close said throttle valve immediately after turning ON of a switch for allowing electric current to flow to the engine; and fast idle control means for changing the fully closed position of said throttle valve larger in a direction to open said throttle valve as an engine temperature lowers to provide a change amount representative of a change in said first fully closed position corresponding value, under action of a thermally responsive member which is deformable in response to the engine temperature;

wherein said contol means further operates for correcting said second fully closed position corresponding value learned by said traction control system fully closed position learning means in accordance with said change amount in said first fully closed position corresponding value provided by said fast idle control means.

11. A throttle control system as claimed in claim 10, wherein said throttle valve is located inside a chamber through which intake air flows to engine cylinders of the engine.

12. A throttle control system as claimed in claim 10, wherein said actuator is a stepping motor operatively connected to said throttle valve.

13. A throttle control system as claimed in claim 10, wherein said switch is an ignition switch electrically connected to an ignition system of the engine.

14. A throttle control system as claimed in claim 10, wherein said fast idle control means includes a fast idle cam operatively connected to said throttle valve, wherein said thermally response member is a wax pellet operatively connected to said fast idle cam.

15. A throttle control system as claimed in claim 10, wherein said control means further operates for correcting said second fully closed position corresponding value by subtracting said change amount from said second fully closed position corresponding value which is before being changed by said fast idle control means.

* * * * *